Patented Apr. 2, 1946

2,397,601

UNITED STATES PATENT OFFICE 2,397,601

PURIFYING DICYCLOPENTADIENE

Howard L. Gerhart, Milwaukee, Wis., and Leon M. Adams, Corpus Christi, Tex., assignors to Pittsburgh Plate Glass Company, a corporation of Pennsylvania No Drawing. Application December 3, 1943, Serial No. 512,770

6 Claims. (Cl. 260—23)

The present invention relates to the separation of cyclic diene hydrocarbons of lower molecular weight from crude sources thereof and it has particular relation to the separation of cyclopentadiene and/or dicyclopentadiene from tars and drip oils constituting a cheap but impure source thereof.

One object of the invention is to provide a simple and inexpensive method whereby cyclopentadiene or dicyclopentadiene may be removed in very high yield from the impure sources and without substantial inclusion of contaminants such as coumarone, indene and other impurities associated therewith and yet in form well adapted for use in resin preparation.

A second object is to provide a process whereby the dimer of cyclopentadiene is recovered in a form particularly adapted to polymerization under heat and pressure with drying oils to provide resins useful as plastics or as oils that can be substituted for tung oil or other drying oils.

These and other objects will be apparent from consideration of the following specification and the appended claims.

It has heretofore been proposed to prepare resinous products of addendum polymerization of cyclopentadiene or its dimer, dicyclopentadiene. By suitable procedures, a considerable number of products can be so obtained. For example, cyclopentadiene in the presence of halides of amphoteric elements and under appropriate temperatures can be polymerized to artificial rubbers, that oxidize in air and form insoluble powders.

In a copending application to Howard L. Gerhart, Serial Number 324,392, filed March 16, 1940, and entitled "Resinous material," are disclosed methods of forming improved products from cyclopentadiene and dicyclopentadiene. In particular, there are disclosed processes of forming copolymers of cyclopentadiene or dicyclopentadiene with unsaturated glyceride oils or free fatty acids from such oils.

The usual procedure in obtaining cyclopentadiene for the manufacture of these copolymers is to distill coal tar, drip oil ("Dripolene") cracked distillates or hydrocarbon mixtures from other sources and to remove the fraction boiling in the range 160 to 180° C. This fraction is further fractionated at reduced pressure to obtain dicyclopentadiene of greater purity. In the case of many mixtures, which contain hydrocarbons having a boiling point close to 170° C. it is very difficult to obtain dicyclopentadiene in a purity exceeding 80 to 90%. This fractionation must be performed at reduced pressure in order to avoid cracking of the dicyclopentadiene. The impure fraction can also be cracked at atmospheric pressure but the yield of cyclopentadiene is never 100%. Some of the dicyclopentadiene forms a residue in the still pot.

By operating according to the present disclosure all the dicyclopentadiene is made available in purified form for the copolymerization process. The invention is based upon the discovery that when a fraction containing dicyclopentadiene is heated to 200 to 230° C. cyclopentadiene polymers of low molecular weight are formed which are insoluble in the normal diluting impurities. These polymers are the trimer, tetramer, pentamer, hexamer, etc., of cyclopentadiene which appear as a slush, since they dissolve with difficulty in the non-polymerized liquids. From this slush the diluting impurities can be separated by several mechanical means.

The present invention involves the further discovery that these polymers of a molecular weight within a range of about 3 to 5 units of cyclopentadiene or $C_5H_6$ are excellently adapted for copolymerization with unsaturated glyceride oils and free fatty acids of such oils to provide products which may be solid resins suitable for use as gums in other oils or which may, themselves, be drying oils, dependent upon the amount of oil present in the copolymerization reaction and the degree of copolymerization.

The solid, low molecular weight polymers free from impurities can be used in place of dicyclopentadiene in the charge to prepare the cyclopentadiene copolymer.

The following examples are illustrative of the invention:

Example I

One hundred sixty pounds of commercial "Dripolene" having the boiling range 26° to 200° C. was fractionated into 12 fractions in a column. To illustrate the difficulty of obtaining pure dicyclopentadiene, three fractions having the boiling ranges (a) 78–84° C./60 mm., (b) 84–90° C./60 mm., (c) 90–95° C./60 mm., were found to contain 50%, 78%, 70%, available cyclopentadiene respectively as determined by carefully cracking at atmospheric pressure. In each case there was a still pot residue which contained some dicyclopentadiene polymers or reaction products for instance, of dicyclopentadiene with indene.

Example II

The fractions can be used in quantitative amounts according to the present disclosure in the preparation of cyclopentadiene type resins.

The three fractions were combined and heated in an autoclave at 200° C. for 2 hours, then at 230° for 2 hours. The gage pressure reached 100 lbs. per sq. inch, but as the reaction proceeded the pressure decreased to 20–50 lbs. per sq. inch. Upon cooling, the mass solidified to a soft slush resembling axle grease. This slush contains the polymers swelled, suspended and partially dissolved in the diluting impurities present in the original fractions. The slush was treated in three ways:

Example IIa

It was filter pressed to remove the liquid components. The liquid filtrate was cooled to "freeze out" more polymeric material which was then filtered preferably at low temperatures.

Example IIb

The slush was agitated with an equal volume of acetone which is a precipitant for most of the polymers and a solvent for the impurities. This granular precipitate is easy to filter.

Example IIc

The slush was heated at reduced pressure to remove 15% of liquid boiling at 30 to 125° at 7 mm. pressure. The residue in the flask was a waxy solid.

A charge consisting of 320 parts of residue from method 3 and 480 parts linseed oil was heated for 5 hours at 270° C. in an autoclave. Thinned in naphtha to 50% solids the copolymer has an E body (Gardner-Holdt scale) and is useful as an enamel or varnish vehicle for air drying and baking applications. There appears to be no qualitative difference between the copolymers prepared from the products of either method of separation above. The separated slush can be substituted for dicyclopentadiene in any of the methods previously disclosed for the preparation of thermal type copolymers.

At reduced pressure, some of the products in the slush may be distilled and identified although this is not a required procedure for the operation of this invention. Thus, the slush from Example II was distilled at reduced pressure as described in Example IIc. Further distillation at a more diminished pressure produced fractions boiling at 110–210° C. at 10 mm. mercury pressure. From these fractions pure trimer and tetramer were crystallized and identified.

Example III

A copolymer was prepared from the relatively purified trimer-tetramer mixture having the distillation range 97° C. to 190° C. at 4 mm. pressure. 320 parts of this solid and 480 parts alkali refined linseed oil was charged into an autoclave provided with agitator, pressure gage and sampling valve. The autoclave was heated according to the following schedule:

| Time | Temperature | Pressure | Gardner-Holdt viscosity 50% petroleum naphtha |
|---|---|---|---|
| Min. | °C. | P. s. i. | |
| 0:00 | Room | 0 | |
| 30 | 160 | 5 | |
| 60 | 225 | 40 | |
| 80 | 250 | 75 | |
| 100 | 250 | 50 | |
| 150 | 260 | 60 | |
| 180 | 275 | 62 | A |
| 270 | 280 | 45 | E |

The reaction product was thinned with petroleum naphtha. It dries as well or better than a Chinawood oil varnish, has excellent water resistance, and is well suited for the preparation of varnishes and enamels by the well-known methods.

The advantage in using the relatively purified trimer and tetramer is that the color of the copolymer is lighter. The glyceride oil copolymers so prepared are equal in every respect to copolymers prepared from dicyclopentadiene and it is intended that methods and products described in copending applications using dicyclopentadiene shall be equivalent when the trimer-tetramer-pentamer mixture is used in place of the dimer.

It is possible that some cyclopentadiene may react with the olefinic diluting impurities under the conditions by which the slush is formed. If such reaction products accumulate in the solid phase of the slush and are charged with oil to prepare the copolymer no harm will result. In fact, many such secondary reaction products are useful in the preparation of these copolymers as described in copending application Serial No. 470,093.

The charge can be varied over wide limits. The copolymer which is most useful as a varnish type product will contain from 30 to 70% oil and 70 to 30% polycyclopentadiene. Copolymers which contain less than 30% oil are inclined to be brittle and are of the nature of varnish type gums. Copolymers which contain greater than 70% oil are very flexible and tend to be of the nature of synthetic oils. A useful copolymer as prepared from 90% linseed oil, 10% dicyclopentadiene by this process dries rapidly and may be considered to be a synthetic substitute for Chinawood oil for many applications.

The following compositions are illustrative of the charges which can be used:

Example A

| | Parts |
|---|---|
| Unbodied alkali refined linseed oil | 600 |
| Lower polymer of cyclopentadiene | 400 |

Example B

| | Parts |
|---|---|
| Unbodied alkali refined soya oil | 540 |
| Lower polymer of cyclopentadiene | 450 |

Example C

| | Parts |
|---|---|
| Alkali refined medium bodied linseed oil | 500 |
| Lower polymer of cyclopentadiene | 500 |

Example D

| | Parts |
|---|---|
| Alkali refined unbodied linseed oil | 600 |
| Trimer or tetramer of cyclopentadiene | 400 |

Example E

| | Parts |
|---|---|
| Alkali refined unbodied soya oil | 900 |
| Lower polymer of cyclopentadiene | 100 |

The copolymer from this composition is a synthetic oil which dries as rapidly as alkali refined linseed oil.

Example F

| | Parts |
|---|---|
| Tung oil | 1,000 |
| Linseed oil | 300 |
| Lower polymer of cyclopentadiene | 1,000 |

Example G

| | Parts |
|---|---|
| Tung oil | 1,000 |
| Lower polymer of cyclopentadiene | 1,000 |

In the examples, "lower polymers of cyclopentadiene" are those containing from 3 to 6 cyclic $C_5H_6$ units.

The forms of the invention herein disclosed are to be considered merely as exemplary. Numerous modifications may be made therein without departure from the spirit of the invention or the scope of the appended claims.

We claim:

1. A method of preparing a resinous product which comprises, in the absence of catalysts, heating in a closed system a mixture of (A) polymers of cyclopentadiene from a class consisting of its trimer, tetramer, and pentamer and (B) an unsaturated glyceride oil to a temperature above 160° C. until a copolymer soluble in petroleum naphtha is obtained.

2. A process as defined in claim 1 in which the glyceride oil is linseed oil.

3. A process as defined in claim 1 in which the glyceride oil is soya bean oil.

4. A method of preparing a resinous product which comprises heating in a closed system a mixture of trimer, tetramer, and pentamer of cyclopentadiene dissolved in an unsaturated glyceride oil and in the absence of polymerization catalysts to a temperature within a range of 160 to 280° C. until a copolymer soluble in petroleum naphtha is obtained.

5. A process as defined in claim 4 in which the unsaturated glyceride oil is linseed oil.

6. A process as defined in claim 4 in which the glyceride oil is linseed oil and is within a range of 30 to 90% based upon the oil cyclopentadiene polymer mixture.

HOWARD L. GERHART.
LEON M. ADAMS.